United States Patent [19]

Plunkett et al.

[11] Patent Number: 4,636,669

[45] Date of Patent: Jan. 13, 1987

[54] TERMINATION ASSEMBLY FOR ELECTRIC FANS

[75] Inventors: Larry E. Plunkett; William M. Gresho, both of Danville, Ill.

[73] Assignee: MSL Industries, Inc., Oakbrook, Ill.

[21] Appl. No.: 665,769

[22] Filed: Oct. 29, 1984

[51] Int. Cl.$^4$ .................... H02K 5/24; F01D 9/04; F04D 29/54

[52] U.S. Cl. ................... 310/51; 310/63; 310/67 R; 310/89; 310/91; 415/119

[58] Field of Search .......... 310/43, 71, 89, 91, 310/68 R, 268, 51, 67 R, 63; 415/119, 211, 142, 144; 416/203, 244 R; 417/353, 354

[56] References Cited

U.S. PATENT DOCUMENTS

| | | | |
|---|---|---|---|
| 2,298,606 | 10/1942 | Wren | 310/91 |
| 3,310,698 | 3/1967 | Krell | 416/244 |
| 3,644,066 | 2/1972 | Heob et al. | 417/354 |
| 3,700,358 | 10/1972 | Papst et al. | 417/354 |
| 3,883,268 | 5/1975 | Evans et al. | 415/119 |

FOREIGN PATENT DOCUMENTS

| | | | |
|---|---|---|---|
| 717801 | 9/1965 | Canada | 415/119 |
| 983469 | 2/1965 | United Kingdom | 415/119 |
| 726358 | 4/1980 | U.S.S.R. | 415/119 |

OTHER PUBLICATIONS

Mellin, R. C., Minimum Noise Fans for a Given Pumping Requirement—Noise Control Engineering, Jan.-Feb. 1975, pp. 35–45.

Robert C. Mellin, Noise and Performance of Automotive Cooling Fans, published 1981, pp. 141–171, Paper No. 0096-736X/81/8901-0141, meeting of Feb. 25–29, 1980, Society of Automotive Engineers.

R. E. Longhouse, Noise Mechanism Separation and Design Considerations for Low Tip-Speed, Axial-Flow Fans Journal of Sound and Vibration (1976), 48(4), 461–474.

Mellin and Sovran, Controlling the Tonal Characteristics of the Aerodynamic Noise Generated by Fan Rotors, Journals of Basic Engineering, Mar. 1970, pp. 143–154.

Fitzgerald and Lauchle, Reduction of Discrete Frequency Noise in Small, Subsonic Axial-Flow Fans, J. Acoust. Soc. Am., 76(1), Jul. 1984, pp. 158–166.

Duncan, Dawson and Hawes, Design Techniques for the Reduction of Interaction Tonal Noise from Axial Flow Fans, (University of Southampton, Sep. 1975), pp. 143–161.

Primary Examiner—Mark O. Budd
Assistant Examiner—D. I. Rebsch
Attorney, Agent, or Firm—Charles F. Pigott, Jr.

[57] ABSTRACT

An electric motor housing having a peripheral frame member, a central motor mounting member and strut members connecting and supporting the frame member and motor mounting member. The peripheral frame member defines a receptacle having an open mouth for receiving a terminal block assembly in a sliding manner. The receptacle also defines a lateral aperture for access to the terminal block. At least one of the strut members defines a longitudinal channel communicating at one end with the open mouth and at its other end with means for access to an electric motor when mounted on the motor housing.

15 Claims, 11 Drawing Figures

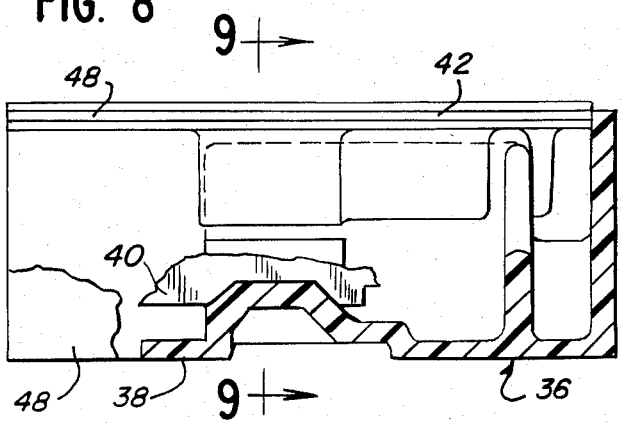
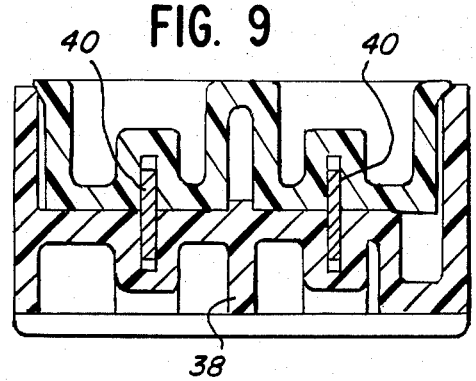
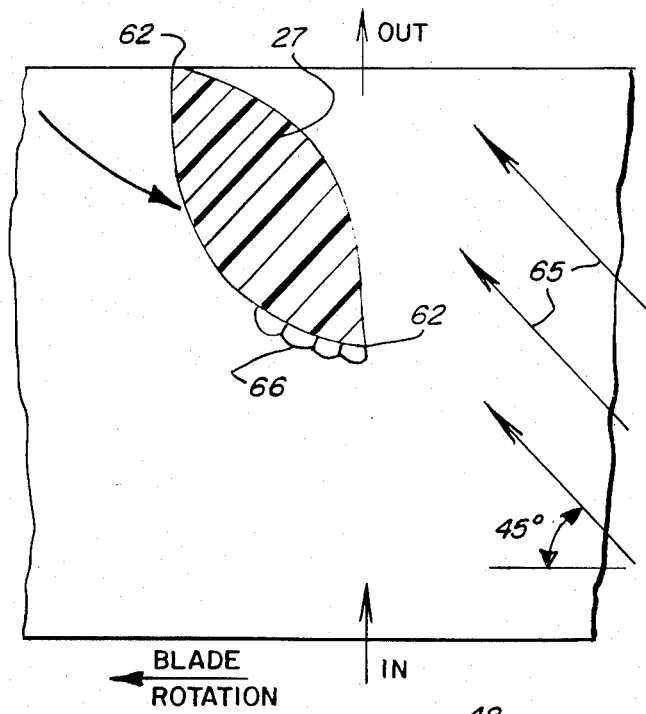
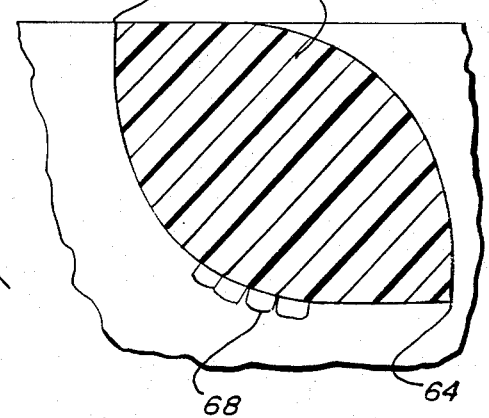
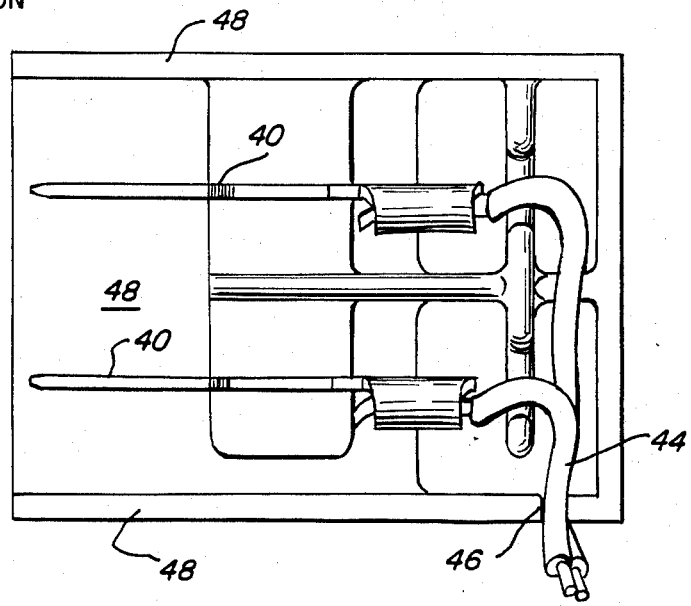

4,636,669

TERMINATION ASSEMBLY FOR ELECTRIC FANS

BACKGROUND OF THE INVENTION

The techniques of termination of electrical wires to permit connection with a source of electric power have always presented a technical problem in electric motor design. Good termination design must be cost effective and flexible, and should permit easy final assembly of the entire motor. Also the design must provide adequate electrical insulation, and meet clearance/creepage requirements. Particularly, the connection of the electric wire through the motor and housing must be well protected so that an accidental jerk of the termination will not cause it to disconnect from the electric motor.

In accordance with this invention, an improved termination system for electric motors is disclosed, particularly in conjunction with an improved electric motor housing which is particularly suitable for mounting an electric fan and motor. The termination system provides good mechanical and insulating protection to the electric wire at its connecting end to the motor, and also at its other end where the terminal block assembly provides further good mechanical protection and insulation.

In conjunction with this, the novel electric motor housing can operate as an electric fan with reduced noise, providing improved aerodynamic characteristics.

DESCRIPTION OF THE INVENTION

In accordance with this invention, an electric motor housing is provided including a peripheral frame member, a central motor mounting member, and strut members connecting and supporting the frame member and motor mounting member. By the improvement of this invention, the peripheral frame member defines a receptacle which, in turn, defines an open mouth for receiving terminal block assembly means in sliding relation thereto. The receptacle also defines a lateral aperture for access to the terminal block.

At least one of the strut members defines a longitudinal channel communicating at one end with the open mouth, and at its other end with means for access to an electric motor when the motor is mounted on the motor housing.

Thus, a terminal block can fit in the receptacle, with electric wire means connecting to it and extending through the longitudinal channel of the strut member into electric connection with an electric motor mounted on the central motor mounting member. Cover member means may be secured to the housing, covering the open mouth of the receptacle and the longitudinal channel, so that the wire is enclosed and well protected.

It may be desirable for the terminal block means to include connector blades for electrical connection with a female electrical socket. The connector blades may project through the lateral aperture defined in the receptacle of the frame member for easy access thereto. In the alternative, the terminal block may be of the lead wire connecting type, holding at least a pair of wires together in connected relation for more permanent attachment of the motor to a power source.

When the terminal block carries projecting connector blades, it is typically desirable for the terminal block to define shroud means surrounding the connector blades on at least three sides for protection of the connector blades. Also, the terminal block may define a base member which holds the connector blades plus a cover member secured to the base member for retention of the connector blades therein. The cover and base are joined in such a manner, for example ultrasonic welding, to secure all elements together and provide the necessary electrical clearances.

Turning to design advantages of the electric motor housing, the strut members may be positioned as a plurality of strut member pairs, the strut members of each pair being positioned closer to each other than to the strut members of other pairs.

At least some of the strut members and preferably all define a substantially air foil shaped cross section with opposed thin edges and a relatively thick center, with one thin edge being directed generally in the direction of air flow propelled from the fan impeller made in accordance with this invention. Because of this design, when the electric motor housing is made of molded plastic or diecast metal, parting lines may be defined on the thin edges of the struts. Thus the parting lines cause minimal noise generation and air turbulence during operation of the fan, when compared with other positions of parting lines on the surface of the struts.

Furthermore, it is desirable for boundary layer spoiler means to be defined on the struts adjacent the thin edge generally facing the air inlet side of the fan. This boundary layer spoiler on the "suction" side of the strut generates a turbulent boundary layer which has been found to contribute to reduction of the air wake trailing from the strut and hence of the noise generated. A roughened surface is one embodiment of a boundary layer spoiler.

Also, significant improvements in the reduction of operating noise may be obtained when the pairs of strut members in an electric fan in accordance with this invention are asymmetrically arranged to suppress simultaneous noise generating interaction between more than one fan blade at a time with said strut members, by causing the fan blades to be out of phase relative to each other and the strut members. Thus there is no reinforcement of the sound pulses generated by operation of the fan and a perceived reduction of the noise of operation. Specifically, the strut members of each pair may be in acute angular relation to each other, defining radial angles to the center of rotation of the motor different from any other strut members.

Further reduction of the noise of operation may be provided when the central motor mounting defines a plurality of reinforcing ribs which are asymmetrically spaced about the center of rotation of the motor. This suppresses harmonic sound wave generation.

DESCRIPTION OF THE DRAWINGS

Referring to the drawings,

FIG. 7 is a sectional view taken along line 7—7 of FIG. 5.

FIG. 8 is a longitudinal sectional view of terminal block assembly means used in this invention.

FIG. 9 is a sectional view taken along line 9—9 of FIG. 8.

FIG. 10 is a plan view of the terminal block assembly means of FIG. 8 with the cover removed.

FIG. 11 is an enlarged sectional view taken along line 11—11 of FIG. 5.

DESCRIPTION OF SPECIFIC EMBODIMENT

Figure 1:
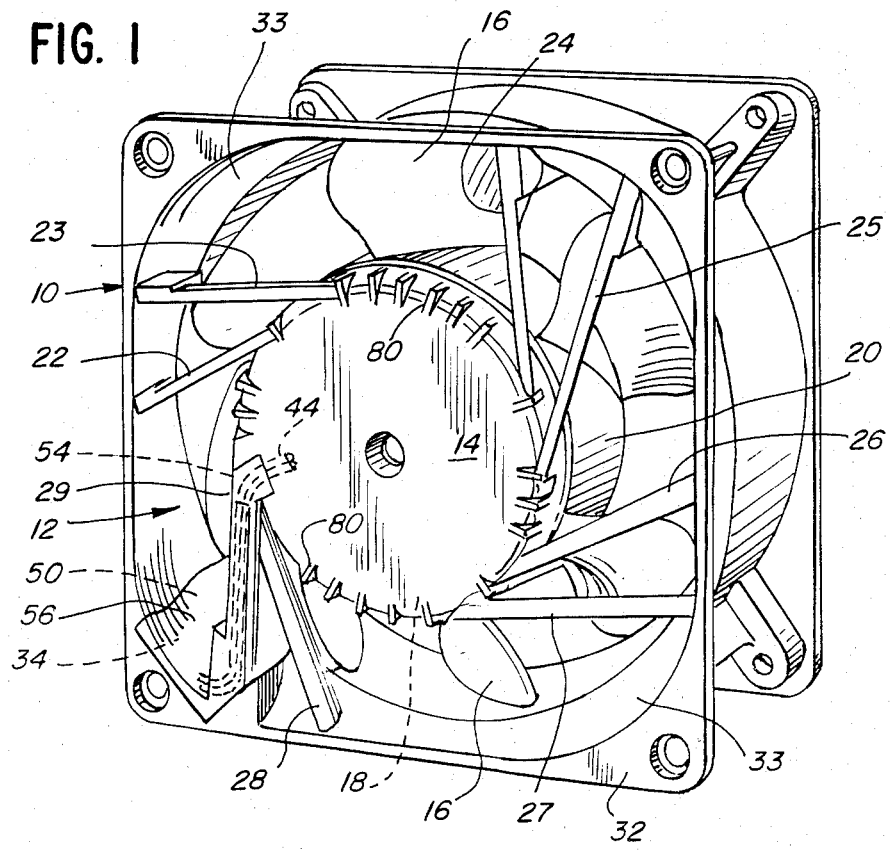
FIG. 1 is a perspective view of an electric fan made in accordance with this invention.

Referring to the drawings, and particularly FIG. 1, an electric fan 10 is disclosed, being made in accordance with this invention.

Fan 10 defines a housing 12 which may be made of a single molded piece of plastic or a diecast piece of metal. Housing 12 defines a central motor mounting member 14 which carries rotatable fan blades 16 carried and operated by motor 18. Motor 18 is carried on central mounting member 14 and positioned within rotatable drum (or hub) 20 to which fan blades 16 are attached. Motor 18 causes drum 20 and fan blades 16 to rotate for fan operation.

Strut members 22-29 are provided, connecting and supporting peripheral frame member 32 and motor mounting member 14 together, typically as an integrally molded piece so that housing 12 can be molded as a single item. Frame member 32 has smoothly curved air flow plenum portions 33 for boosted pressure recovery and hence improved efficiency.

In accordance with this invention, frame member 32 defines a receptacle 34, which is an open aperture or chamber defined within frame member 32, for receiving terminal block assembly means 36 in sliding relation therein.

The terminal block assembly 36 as shown in FIGS. 8-10 includes a base member 38 which holds connector blade means 40, shown partly broken away in FIG. 8, the connector blade means being for electrical connection with a female electrical outlet.

A cover member 42 is also provided and secured to the base member for retention of connector blades 40 therein.

Figure 2:
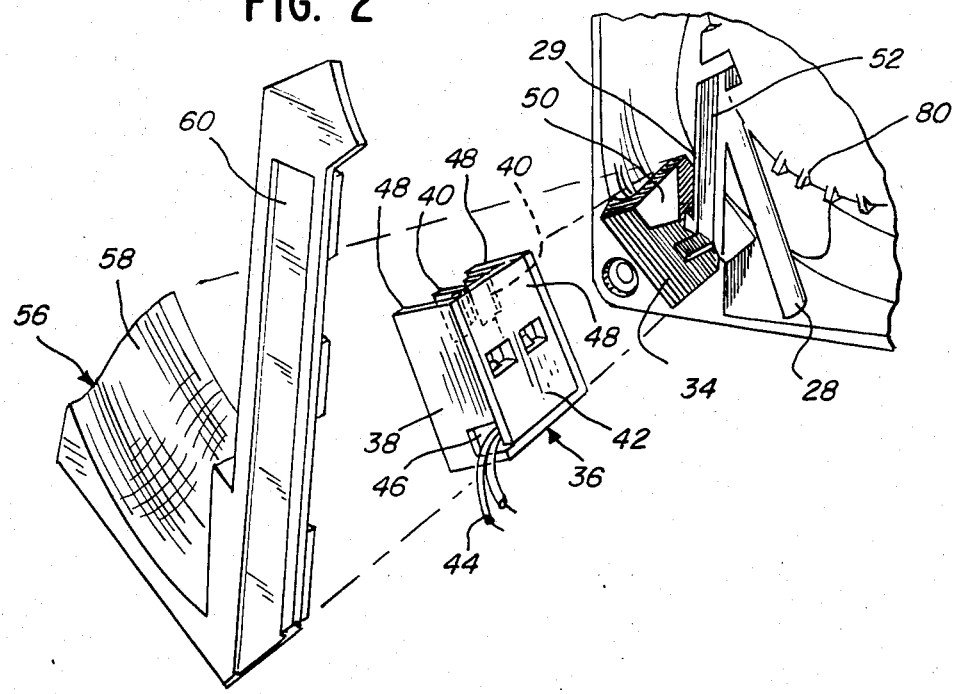
FIG. 2 is a fragmentary exploded perspective view of one portion of the fan of FIG. 1.

Electrical wire 44 passes into terminal block 36 through aperture 46 (see FIG. 2). Electrical wires 44 are in communication with motor 18 so when connector blades 40 are brought into contact with a female connector in communication with an electrical potential the electric current is carried to motor 18.

Terminal block assembly 36 defines three shroud walls 48 which surround connector blades 40 on three sides for protection thereof and providing an electrical barrier to give the necessary clearance and creepage distances to prevent electrical breakdown.

When terminal block assembly 36 slides into receptacle 34. connector blades 40 are exposed to lateral aperture 50, which is open to the exterior so that access may still be obtained to connector blades 40 for making electrical connection with motor 18.

Wires 44 projecting from aperture 46 of terminal block 36 may extend from the terminal block in a longitudinal channel 52 defined in strut 29, passing through aperture 54 in the wall of central motor mounting member 14 into electrical communication with motor 18. See FIGS. 1, 2, 5 and 6.

Cover member means 56 (FIG. 2) is provided to cover receptacle 34 and longitudinal channel 52, with electrical wires 44 positioned therein as shown in FIG. 1. The specific design of cover member 56 is shown in FIG. 2, with a relatively enlarged sloping portion 58 for covering receptacle 34 as it contains terminal block 36, and a generally flat, elongated portion 60 for covering longitudinal channel 52 in strut member 29. Cover member 56 may be sealed by any desired means in its position, for example ultrasonic sealing, adhesive bonding, or the like.

Accordingly, terminal block 36, and its electrical wire connection with motor 18, are sealed in a secure, closed, protected place by the cover member 56, the only exposed portion of the system being blades 40, protected by shroud walls 48, and easily accessible to a female electrical connector.

If desired, blade type terminal block 36 may be replaced by a lead wire type of terminal block, where wires are retained in a secure position by mating halves of such a terminal block with one portion of said lead wires projecting out of aperture 50 for relatively permanent connection to an electrical source, the other section of the said lead wires extending through longitudinal channel 52 of strut member 29 into electrical communication with motor 18.

Turning to the design of the strut members, it can be seen that strut members 22-29 are positioned in a plurality of pairs, the strut members of each pair being positioned closer to each other than to the strut members of other pairs. Specifically, strut members 22 and 23, 24 and 25, 26 and 27, and 28 and 29 each make up separate strut member pairs fitting the above description. Strut members 28 and 29 (with strut member 29 containing longitudinal channel 52) are preferably approximately equally larger in their transverse dimensions relative to the other strut members. This can be seen by comparing strut member 28 in FIG. 11 with strut member 27 in FIG. 7. It has been found to be advantageous in terms of improved noise suppression to have the strut members in geometrically similar pairs, and thus to have the matching strut member 28 to the hollow, channel-containing strut member 29 to be of larger and approximately similar transverse dimension, when compared with the smaller thinner strut members 22 through 27.

Strut members 22-29 also can be seen to generally define a substantially air foil-shaped cross section, with opposed thin edges 62, 64 as shown in FIGS. 7 and 11. One thin edge may be directed generally in the direction of air flow 65 through the fan. This configuration with respect to the air flow results in a reduced drag profile to the air flow, providing a reduced wake and further noise suppression.

As previously stated, electric motor housing 12 may be a single, integrally molded or diecast structure. In this circumstance, the various strut members are made of molded plastic or diecast metal, and the parting lines may be positioned at thin edges 62, 64. When so positioned, noise generation by the parting lines in the air stream is minimized, when compared with placement of the mold parting lines elsewhere along the struts, in which circumstance the parting line can serve as a turbulence promoting member, with less desired results.

Figure 3:
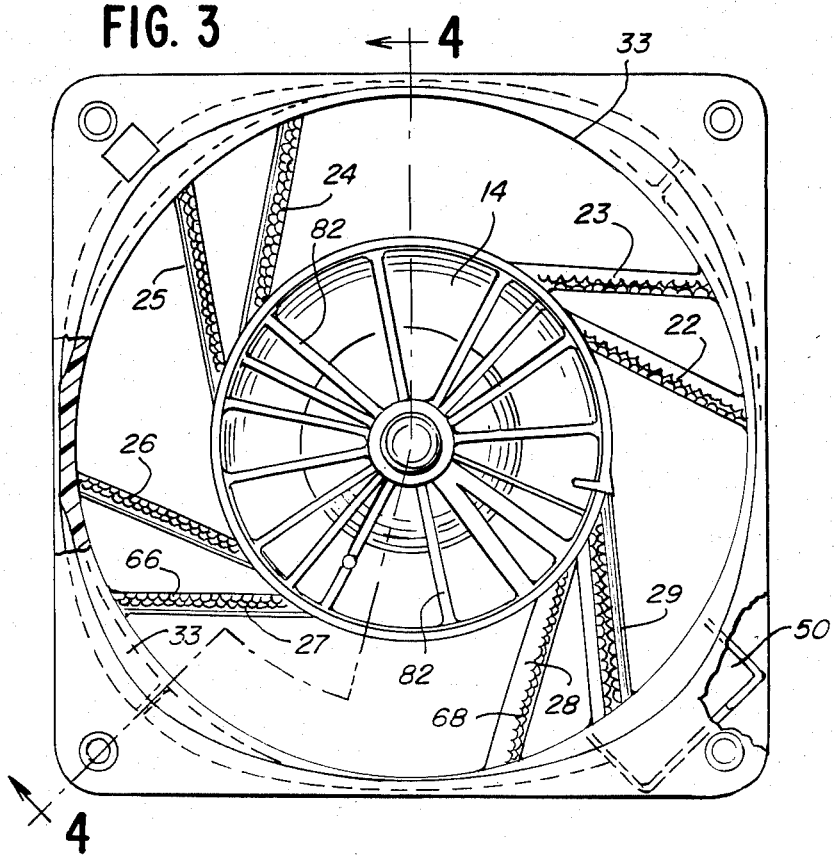
FIG. 3 is an elevational view of the rear side of the electric fan of FIG. 1 with the motor and fan blades removed.
Figure 4:
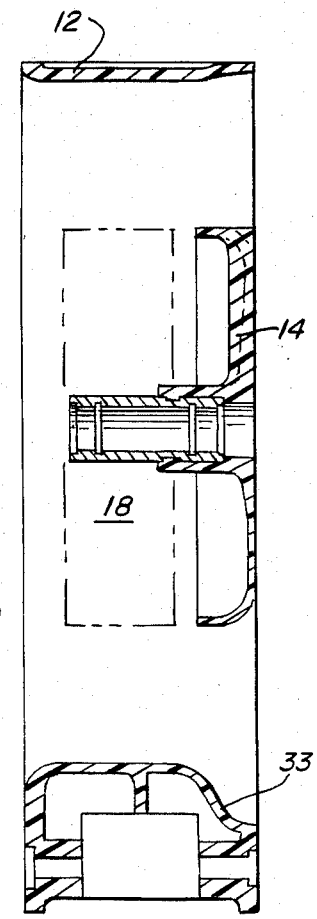
FIG. 4 is a sectional view taken along line 4—4 of FIG. 3.

Also, as shown in FIG. 3, 7, and 11, spoiler means 66, 68 may be defined adjacent the thin edges 62, 64 generally facing the air inlet side of the fan, and on all of the other struts, too. These spoiler means may be simply produced by providing a roughened mold surface at that point or some other distinct perturbation in the strut surface with the dimensions of the spoiler structure being only a matter of a few thousandths of an inch in height above the strut surface; typically no more than is necessary to penetrate the air flow boundary layer thickness. The spoiler means changes the nature of the flow boundary layer to a turbulent layer; reduces the flow wake; and hence participates in the overall noise suppressing charactistic of the fan of this invention.

Furthermore, it is preferred for the positioning of struts 22-29 to be an asymmetrical arrangement in such a manner as to suppress simultaneous noise generating interaction between more than one fan blade at a time with each strut member, by causing the fan blades to be out of phase relative to each other and the strut members. In other words, as shown in the fan of FIG. 1 where seven blades 16 are provided, the strut members 22-29 are so positioned that no two fan blades can be in the same positional relationship with a strut member as any other fan blade with any other strut member. Accordingly, as the fan blades are moving past the strut members, they drive air toward the strut members and create accoustic waves. However, since the fan blades and strut members are all out of phase with respect to each other, the accoustic waves generated are not directly reinforced but have additive effects minimized. This diffuses and suppresses the perceived sound from the system, resulting in significantly quieter operation.

In specific embodiments of this application for four pairs of struts, one angular spacing of the strut member pairs is as follows: 89° between struts 23 and 25; 84° between struts 23 and 29; 116° between struts 29 and 27; and 71° between struts 27 and 25. Another embodiment which has resulted in noise reduction is the sequence 109°, 68°, 112° and 71°.

Figure 5:
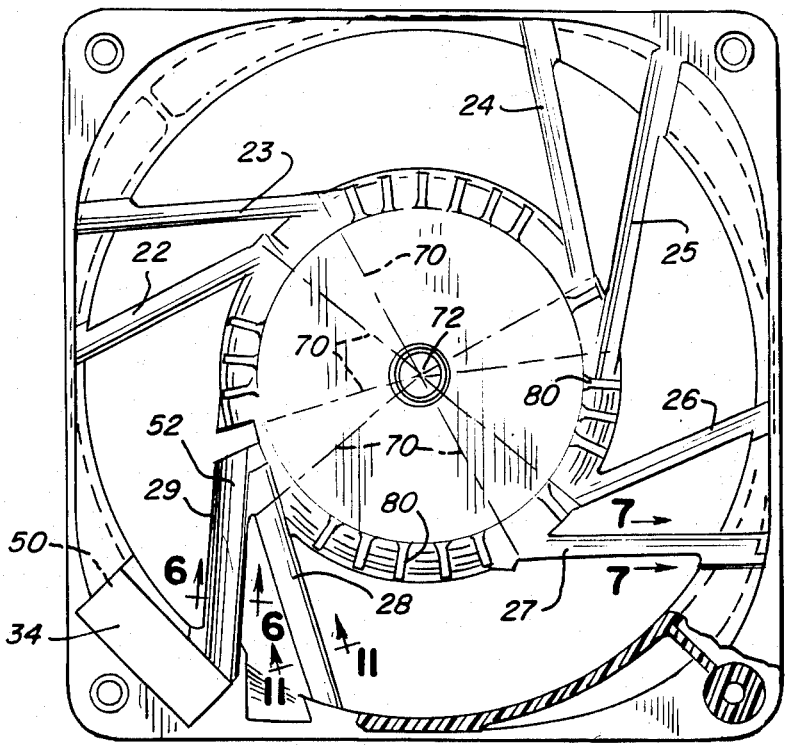
FIG. 5 is an elevational view of the front side of the electric fan of FIG. 1, with certain parts removed.
Figure 6:
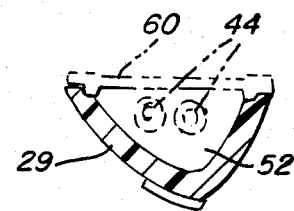
FIG. 6 is an enlarged sectional view taken along line 6—6 of FIG. 5.

The strut members of each pair are in acute angular relationship to each other and define radial angles to their respective radii 70 to the center of rotation 72 of said motor which differ from other strut members. Specifically, the radial angles are shown in FIG. 5 for the respective struts, in this specific embodiment, as follows: 67° for struts 22 and 23; 71° for struts 24 and 25; 64° for struts 26 and 27; and 80° for struts 28 and 29.

This arrangement of struts provides the out of phase relationship described above with seven equally spaced fan blades. For other numbers of fan blades 16, other out of phase strut arrangements may be selected. Also this specific arrangement is for four pairs of struts. Other arrangements are possible for other numbers of strut pairs which are equally effective.

Central motor mounting member 14 also defines a plurality of reinforcing ribs 80 asymmetrically spaced about the center of rotation of motor mounting member 14. The asymmetric arrangement of these reinforcing ribs 80 suppresses harmonic sound wave generation. Internal ribs 82 on member 14 (FIG. 3) are also asymmetrically spaced for reasons of strength and stress transmittal to the asymmetrically spaced struts.

Accordingly, the electric fan of this invention exhibits significant technical advantages over prior art electric fans. The problem of electric wire termination is solved by a substantially enclosed electric wire system with a terminal block captured in a receptacle in the housing having connection members exposed for ready access. Furthermore, the various design features described above provide significantly reduced noise during operation of the fan or other electric motor driven apparatus as may be desired.

The above has been offered for illustrative purpose only, and is not for the purpose of limiting the scope of the invention of this application, which is as defined in the claims below.

That which is claimed is:

1. In an electric motor housing, a peripheral frame member, a central motor mounting member carrying an electric motor, and strut members connecting and supporting said frame member and motor mounting member, the improvement comprising, in combination:

said peripheral frame member defining a receptacle defining an open mouth for receiving terminal block assembly means in sliding relation thereto, said receptacle also defining a lateral aperture for access to said terminal block;

at least one of said strut members defining a longitudinal channel communicating at one end with said open mouth and at its other end with means for access to said electric motor, electric wire means connecting said electric motor and terminal block assembly and occupying said longitudinal channel, said strut members being positioned in a plurality of pairs, the strut members of each pair being positioned closer to each other than to the strut members of other pairs, the strut member which defines the longitudinal channel, and the other strut member of its pair, being both approximately equally larger in their transverse dimensions relative to the other strut members.

2. The electric motor of claim 1 which is an electric fan.

3. The electric motor of claim 1 in which said terminal block means includes connector blade means projecting through said lateral aperture.

4. The electric motor of claim 3 in which said terminal block means defines shroud means surrounding said connector blade means on at least three sides.

5. The electric motor of claim 3 in which said terminal block means defines a base member which holds said connector blade means, and a cover member secured to said base member for retention of the connector blade means therein.

6. The electric motor of claim 1 in which said terminal block holds at least a pair of wires in connected relation.

7. The electric motor of claim 1 which is an electric fan and in which at least some of said strut members define a substantially air foil shaped cross section with opposed thin edges and a relatively thick center, with one thin edge being directed generally in the direction of air flow through said fan.

8. The electric fan of claim 7 which is made of molded plastic or diecast metal and in which parting lines are defined on said thin edges.

9. The electric fan of claim 7 having an air inlet side and in which spoiler means is defined adjacent the thin edge generally facing said air inlet side of said fan.

10. The electric motor of claim 1 which is an electric fan having rotatable fan blades on said electric motor, and in which said pairs of strut members are asymmetrically arranged to suppress simultaneous noise generating interaction between more than one fan blade at a time with said strut members by causing said fan blades to be out of phase relative to each other and said strut members.

11. The electric motor of claim 10 in which the strut members of each pair are in acute angular relation to each other and define radial angles to the center of rotation of said motor different from any other strut members.

12. The electric motor of claim 10 in which said central motor mounting defines a plurality of reinforcing ribs asymmetrically spaced about the center of rotation of said motor to suppress harmonic sound wave generation.

13. In an electric motor, a housing which comprises a peripheral frame member, a central motor mounting member, and strut members connecting and supporting said frame member and motor mounting member, terminal block assembly means for communication with a source of electric power, and electric wire means connecting said electric motor and terminal block assembly, the improvement comprising, in combination:

said peripheral frame member defining a receptacle defining a open mouth for receiving said terminal block assembly means in sliding relation thereto, said receptacle also defining a lateral aperture for access to said terminal block assembly means, at least one of said strut members defining a longitudinal channel communicating at one end with said open mouth and at its other end with means for access to said electric motor, said electric wire means occupying said longitudinal channel, cover means secured to said housing covering said open mouth and longitudinal channel, said terminal block means including connector blade means projecting through said lateral aperture, the terminal block means also defining shroud means surrounding said connector blade means on at least three sides, said strut members being positioned in a plurality of pairs, the strut members of each pair being positioned closer to each other than to the strut members of other pairs, said electric motor carrying rotatable electric fan blades, said strut members defining a substantially air foil shaped cross section with opposed, thin edges and a relatively thick center, with one thin edge being directed generally in the direction of air flow through said fan blades, said pairs of strut members being asymmetrically arranged to suppress simultaneous noise-generating interaction between more than one fan blade at a time with said strut members by causing the fan blades to be out of phase relative to each other and said strut members.

14. The electric fan of claim 13 in which said housing is made of molded plastic or diecast metal and in which parting lines are defined on said thin edges of the strut members.

15. The electric fan of claim 14 having an air inlet side and in which a roughened spoiler surface is defined adjacent the thin edges of said strut members generally facing said air inlet side of said fan.

* * * * *